(12) United States Patent
Lawing et al.

(10) Patent No.: US 7,120,684 B2
(45) Date of Patent: Oct. 10, 2006

(54) METHOD AND SYSTEM FOR CENTRAL MANAGEMENT OF A COMPUTER NETWORK

(75) Inventors: Rod D. Lawing, Cedar Rapids, IA (US); Joan E. McKinley, Mesa, AZ (US)

(73) Assignee: Electronic Data Systems Corporation, Plano, TX (US)

( * ) Notice: Subject to any disclaimer, the term of this patent is extended or adjusted under 35 U.S.C. 154(b) by 546 days.

(21) Appl. No.: 10/076,729

(22) Filed: Feb. 15, 2002

(65) Prior Publication Data

US 2002/0112150 A1    Aug. 15, 2002

Related U.S. Application Data

(63) Continuation-in-part of application No. 09/177,086, filed on Oct. 22, 1998, now abandoned.

(51) Int. Cl.
*G06F 15/173* (2006.01)
(52) U.S. Cl. .................. 709/223; 709/203; 709/220
(58) Field of Classification Search ............... 709/223, 709/224, 203, 220–221
See application file for complete search history.

(56) References Cited

U.S. PATENT DOCUMENTS

| | | | |
|---|---|---|---|
| 5,742,829 A * | 4/1998 | Davis et al. | 717/178 |
| 5,745,879 A | 4/1998 | Wyman | 705/1 |
| 5,794,052 A * | 8/1998 | Harding | 717/178 |
| 5,978,590 A * | 11/1999 | Imai et al. | 717/177 |
| 6,006,035 A * | 12/1999 | Nabahi | 709/221 |
| 6,035,423 A * | 3/2000 | Hodges et al. | 709/219 |
| 6,047,312 A | 4/2000 | Brooks et al. | 709/203 |
| 6,151,709 A | 11/2000 | Winkel | 717/11 |
| 6,157,378 A | 12/2000 | Bormann et al. | 345/329 |
| 6,239,800 B1 * | 5/2001 | Mayhew et al. | 345/764 |
| 2002/0112150 A1 | 8/2002 | Lawing et al. | |

FOREIGN PATENT DOCUMENTS

| | | |
|---|---|---|
| EP | 0 834 809 A2 | 4/1998 |
| EP | 0 964 334 A2 | 12/1999 |
| EP | 1 168 163 A1 | 1/2002 |
| GB | 2 310 298 A | 2/1996 |

* cited by examiner

*Primary Examiner*—Philip B. Tran
(74) *Attorney, Agent, or Firm*—Baker Botts L.L.P.

(57) ABSTRACT

A method and system for central management of plural network clients interfaced with a network host, each network client automatically calling a login routine (20) and a start-up routine (22) associated with initiation of a login script at the network client. Configuration and start-up management can be based upon an operating system determination with several different operating systems, such as Windows 95 and Windows NT, deployed across the network. The login routine (20) can install the start-up routine (22) on the network client at login, allowing the start-up routine (22) to direct the network client to install predetermined local utilities and to load predetermined network utilities. An associated launch manager (24) can establish launch manager values to allow a network user to individualize his network client within constraints defined by computing standards established through the login routine.

43 Claims, 6 Drawing Sheets

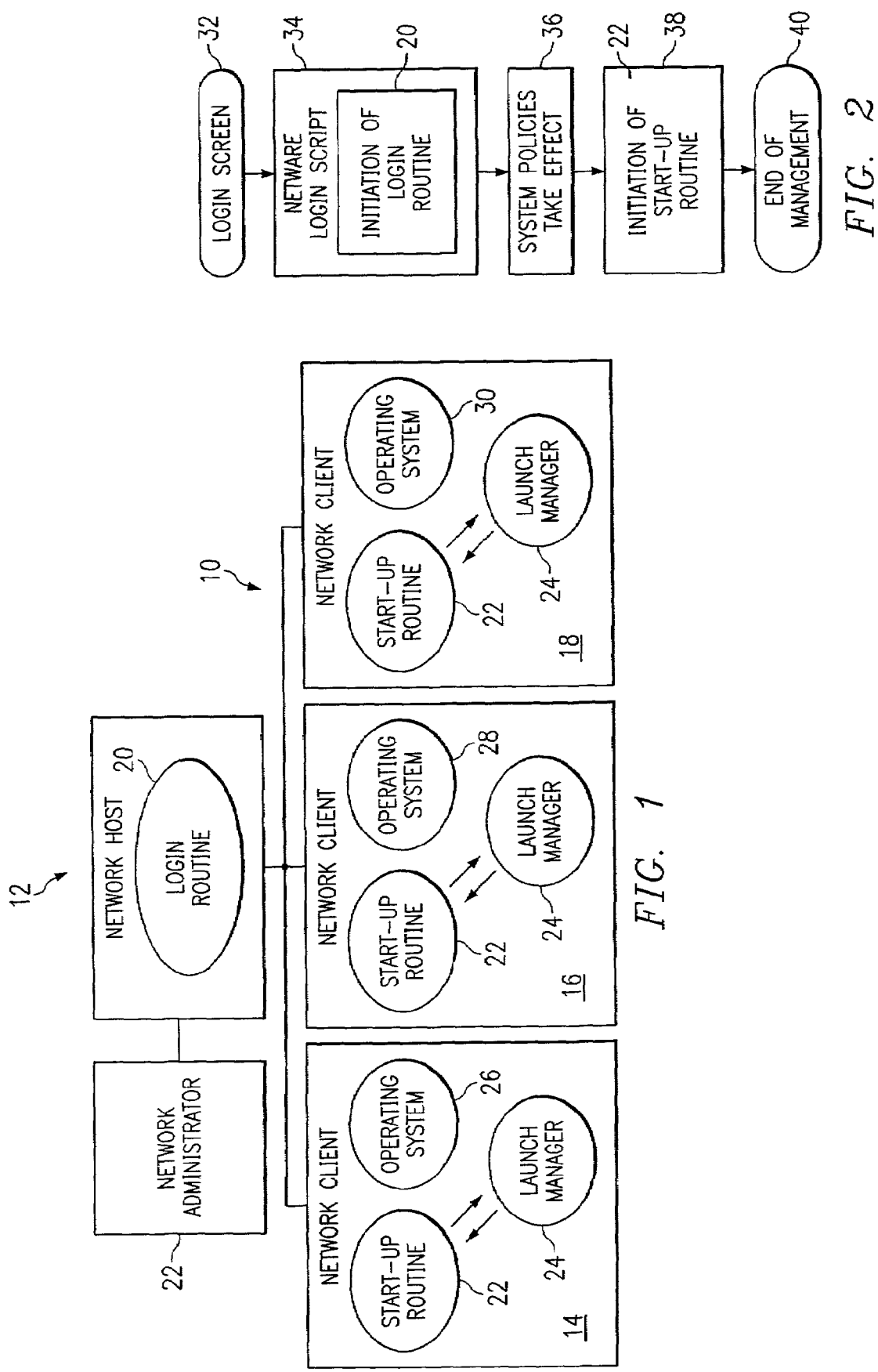

TO FIG. 6B

METHOD AND SYSTEM FOR CENTRAL MANAGEMENT OF A COMPUTER NETWORK

RELATED APPLICATIONS

This application claims priority as a continuation-in-part of U.S. patent application Ser. No. 09/177,086, filed on Oct. 22, 1998, now abandoned, entitled "Method and System for Central Management of a Computer Network," by Lawing, et al.

TECHNICAL FIELD OF THE INVENTION

The present invention relates generally to computer networks, and more particularly to central management of a computer network configuration and start-up.

BACKGROUND OF THE INVENTION

Computer networks have changed the way the world does business. For instance, businesses employing computer networks are able to enhance the efficiency of their employees by increasing the ease with which information can flow throughout the business. However, the improved efficiency provided by computer networks has come at a price. Businesses have invested considerable capital in the hardware needed to put their computer networks into place, including the purchase of personal computers capable of performing at designed levels, and the purchase of hardware and wiring needed to interconnect the personal computers. Businesses have also invested considerable capital in purchasing and maintaining software utilities needed for the proper functioning of the computer networks as well as software needed by employees to perform business functions. In addition to the significant capital investments in hardware and software for their computer networks, businesses also spend considerable amounts of money and resources for hiring and retaining personnel to perform maintenance on the network hardware and software.

One difficulty in setting up and maintaining a computer network, whether as a local area network or a wide area network, is the diversity in the types of personal computers and personal computer components that can be interfaced with a network. For instance, personal computers interfaced with a network can operate with different types of processors, different hardware configurations, and different drivers for hardware components on the computer. Another difficulty is the diversity in the types of programs that each personal computer interfaced with a network can use. For instance, each personal computer can operate with different computer operating systems, such as Windows, Windows NT, OS2, Unix, or other types of personal operating systems. These difficulties are compounded by the piecemeal fashion in which computer networks are frequently assembled. For instance, as a business grows, the business typically adds additional components and software to existing networks. Each addition can include new hardware or software, including new versions of existing hardware and software, which may not be completely compatible with existing systems.

The difficulty in configuring personal computers to interface with a computer network are further compounded by other factors common in the corporate network computing environment. For instance, personal computers interfaced with a network are frequently dispersed geographically across a business site or even across the country or world. Thus, in order to configure, manage and operate personal computers interfaced with a network, computer information systems personnel must travel to each computer as needed. This inefficiency increases the labor costs associated with operating the computer network. Another difficulty that compounds the operation and maintenance of personal computers interfaced with a computer network is the piecemeal fashion in which computer networks are frequently assembled. For instance, as a business adds or loses personnel, computers can be added or removed from the network. Each time a computer is added or removed, additional information systems labor is required to configure the computer and network as needed. In businesses with a high turnover or businesses with a mobile work force, frequent changes can result in high levels of labor expenses as technicians physically walk to each individual personal computer to perform software installation and distribution, configuration management, and problem resolution.

SUMMARY OF THE INVENTION

Therefore a need has arisen for a method and system which allow for efficient central management of a network.

In accordance with the present invention a method and system for centrally managing network clients interfaced with a network host is provided that substantially eliminates or reduces disadvantages and problems associated with previously developed techniques for managing a network. Initiation of a login script at a network client automatically calls up a login routine and a start-up routine. The login routine and start-up routine determine the operating system of the network client and manages the start up of the network client according to the operating system determination.

More specifically, initiation of a login script at a network client can automatically call a login routine to operationally manage the configuration of the network client. For instance, the login routine can gather system information and create standard directories for the network client. The login routine can then determine the operating system of the network client, and, based upon the operating system determination, can perform configuration management, including the installation of default applications, the management of start up files, setting DNS information, setting up consistent desktop configurations, running a virus scan, running monthly maintenance such as a scan disk, turning on system policies, and providing a computer information report. The login script can call the login routine from the network host, or can call the configuration management engine from local memory of the network client.

One function of the login routine can be to call the start-up routine from either the network host or from local memory of the network client. The start-up routine can determine the operating system of the network client, and based upon the operating system determination, can direct the network client to install predetermined local utilities and to load predetermined network utilities.

The start-up routine can interface with a launch manager to allow the user of a network client to establish launch manager values associated with predetermined standard utilities. The start-up routine can read the launch manager values for the network client to allow the start-up routine to install predetermined local utilities according to the launch manager values set by the launch manager. When the start-up routine is called, it looks for a start-up switch to determine if the network client is in its initial boot or has already been booted up. If the network client is in its initial boot, the start-up routine performs start-up management steps. If, instead, the network client is already booted up based upon the start-up switch determination, then the launch manager will determine the operating system of the network client and allow the network client user to establish launch manager values.

The present invention provides important technical advantages. For instance, the present invention allows a network owner to establish computing standards within the network that can allow the network to reliably meet performance needs of the network's users. The present invention allows network administrators to efficiently orchestrate an almost infinite combination of hardware, software, operating systems and protocols with centralized management.

Another important technical advantage of the present invention is that it allows central management of a large number of personal computers that are interfaced with a network. Central management allows the network owners to reduce maintenance and support costs by reducing the need to have technicians physically visit each personal computer associated with the network when software installation, distribution, problem resolution, configuration management and other maintenance functions are needed to be performed.

Another important technical advantage of the present invention is that it reduces the time needed to resolve problems and upgrade network applications by the distribution of patches and configuration upgrades, thus reducing the disruption to business functions.

BRIEF DESCRIPTION OF THE DRAWINGS

A more complete understanding of the present invention advantages thereof may be acquired by referring to the following description taken in conjunction with the accompanying drawings in which like reference numbers indicate like features and wherein:

FIG. 1 depicts a schematic overview of a centrally managed network according to the present invention;

FIG. 2 depicts an exemplary flow diagram of a login by a personal computer to a network configured according to the present invention;

DETAILED DESCRIPTION OF THE INVENTION

Figure 3:
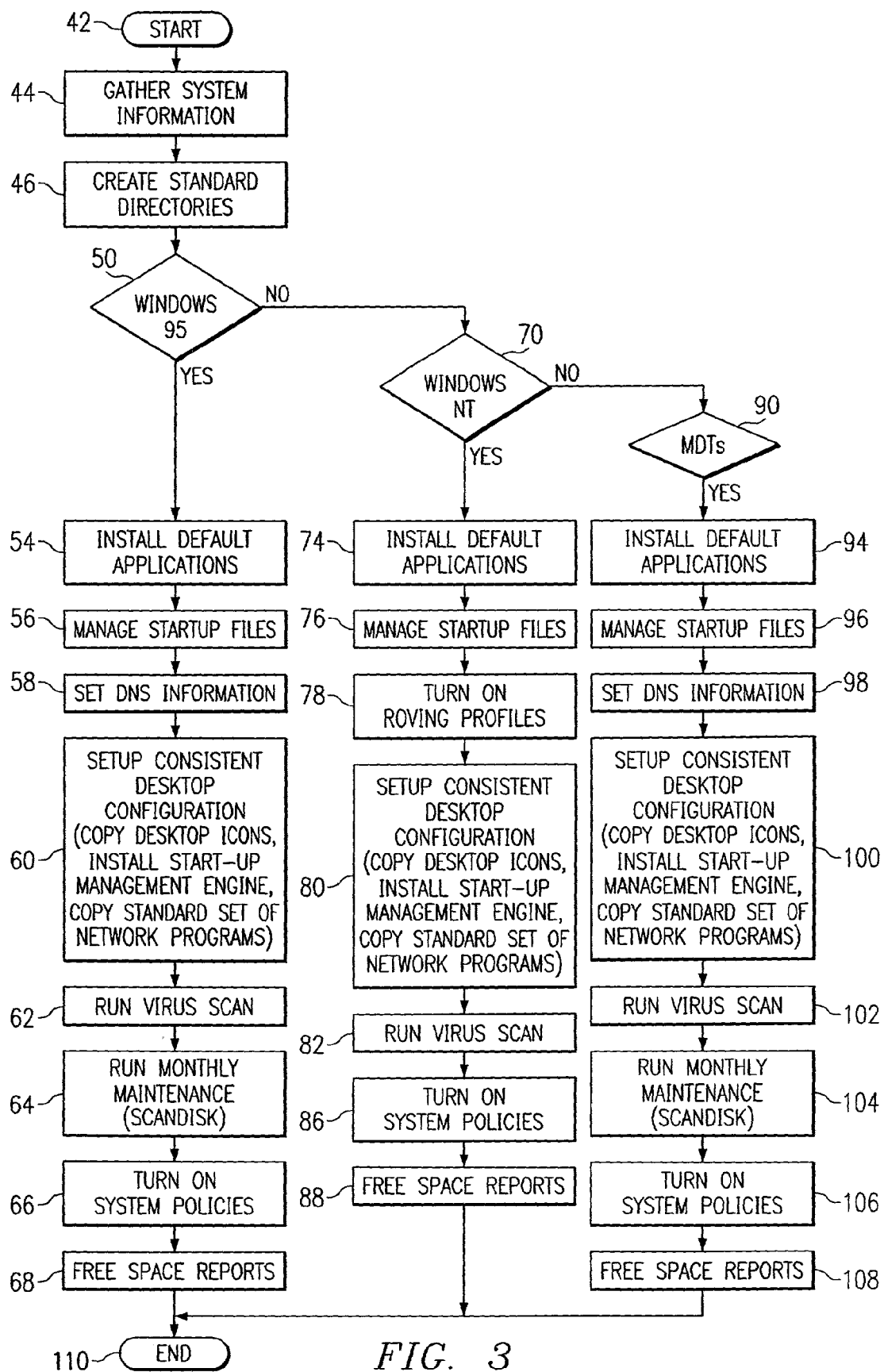
FIG. 3 depicts an exemplary flow diagram of a login routine.

Preferred embodiments of the present invention are illustrated in the figures, like numerals being used to refer to like and corresponding parts of the various drawings.

The present invention uses central management of network assets to simplify network deployment, maintenance and support. A network administrator can globally manage and resolve problems on multiple workstations from one central management station. A login routine can set and maintain network and personal computer configuration, can initiate virus scanning, and can initiate system hardware and software checks and maintenance. A launch manager can control programs executed by the startup routine at login. These tools can significantly reduce the labor required to manage the workstations in local area networks and wide area networks, can reduce the disruption that can result from operating system and application upgrades, can provide for timely problem resolution through the distribution of patches and configuration upgrades, and can reduce delivery time for applications setup and installation.

Referring now to FIG. 1, a simplified overview of a computer network 10, having a network host 12 and plural network clients 14, 16 and 18, is depicted. Computer network 10 can be either a local area network or a wide area network. Network host 12 can be any Intel-based or compatible file server running a NetWare or Microsoft NT Operating System having sufficient computing capacity to support plural network clients. Network clients 14, 16 and 18 can be any Intel-based or compatible computer architecture running a Microsoft Operating System, such as personal computers using IBM compatible processors. In alternative embodiments, a wide variety of network configurations could be supported by the present invention, including combinations of local area and wide area networks interfaced with each other, networks having multiple hosts, and networks having a wide variety and number of clients.

A login routine 20 resides on network host 12, which is operational to execute login routine 20 on network clients during login by the clients to the network host. A network administrator 22 interfaced with network host 12 can maintain and update login routine 20 as needed. In this way, login routine 20 can set and maintain network and network client configuration and engage policy information. For instance, network administrator 22 can define default utilities so that login routine 20 can direct installation on network clients. Network administrator 22 can also define hardware and software checks and system maintenance functions within login routine 20. For instance, network administrator 22 can define a trigger for virus scanning, such as at each initial boot, and a schedule to run scan disk and defrag programs such as at predetermined monthly intervals. In an alternative embodiment, network administrator 22 can establish parameters for login routine 20 and can then direct network host 12 to send login routine 20 to reside on network clients 14, 16 and 18.

A startup routine 22 and launch manager 24 reside on each network client 14, 16 and 18. Startup routine 22 and launch manager 24 can be installed in each network client by login routine 20. In an alternative embodiment, startup routine 22 and launch manager 24 can reside on network host 12. Startup routine 22 provides boot-up control of its network clients and allows the network client to run applications based upon predefined configuration parameters. Startup routine 22 directs the network client to install predetermined local utilities and to execute predetermined network utilities. A user of a network client can select the predefined local utilities executed by startup routine 22 by running launch manager 24. Launch manager 24 values can be stored in local memory of a network client, or can be stored in network memory associated with network host 12, to allow a network user to control the execution of predefined network utilities. Each network client 14, 16 and 18 operate under the control of an operating system 26, 28 and 30, respectively. Login routine 20 and startup routine 22 recognize and identify various types of operating systems, and configure and start-up each network client according to the type of operating system controlling each respective network client.

Referring now to FIG. 2, a flow diagram of a login by a network client is depicted. A login screen 32 is presented to the network client, such as a login screen that can be provided by Novell networking software. A user can initiate the login routine at the local computer by providing personal security information. When the network client processes the network login script, login routine 20 is initiated. Login routine 20 determines if the network client is operating under Windows 95 or Windows NT, and can invoke Microsoft system policies in accordance with those operating systems. On completion of configuration of the network client by login routine 20, systems policies take effect at step 36. Next, at step 38, the startup routine is executed. Startup routine 22 is initiated during the startup of the network client and is loaded into local memory of the network client. Startup routine 22 directs the network client to install predetermined local utilities and to load predetermined network utilities so that, at the end of management at step 40, the network client is available for use.

Referring now to FIG. 3, a flow diagram depicts the steps performed by one embodiment of login routine 22 to manage the configuration of a network client. Login routine 22 is called at step 42 to start management of the network client configuration based upon the initiation of a NetWare login script. Login routine 22 gathers system information at step 44 and then creates standard directories at step 46.

Once standard directories have been created, login routine 22 determines the operating system of the network client by, at step 50, determining if Windows 95 is active on the network client. If Windows 95 is not active on the network client, then login routine 22 determines, at step 70, whether Windows NT is active on the network client. Next, if neither Windows 95 nor Windows NT are active on the network client, login routine 22 determines if the network client is a mobile data terminal, commonly used in field areas, that has a customized version of Windows 95. In alternative embodiments, login routine 22 can test for other operating systems, including Windows 3.1, newer versions of Windows such as Windows 98, or alternative operating systems, such as OS2 or Unix. Login routine 22 then configures the network client according to the operating system on the network client. For instance, if login routine 22 determines the operating system of the network client is Windows 95, it will perform steps 54 through 68; if the login routine's operating system determination detects Windows NT, it will perform steps 74 through 88; and if the login routine's operating system determination detects a mobile data terminal (MDT), it will perform steps 94 through 108.

At steps 54, 74, and 94, login routine 22 triggers installation for the default applications to the network client, and at steps 56, 76, 96, login routine 22 manages start-up files for the network client. Login routine 22, at steps 60, 80 and 100, sets up a consistent desktop configuration. For instance, login routine 22 copies desktop icons for each Windows operating system, and copies a standard set of network programs compatible with each respective operating system. Also, at step 60, 80 and 100, login routine 22 installs launch manager 24 onto the network client so that the launch manager 24 can be called by the network client.

Finally, login routine 22 performs hardware and software checks and system maintenance. Login routine 22 at steps 62, 82 and 102 triggers a virus scan as one example of a software check. Login routine 22 implements preventive maintenance, such as scandisk or defrag, as depicted at step 64 and 104 as examples of hardware checks. Next, when the network client is running Windows 95 or Windows NT as the operating system, login routine 22 turns on system policies at step 66, 86 and 106, which can control the network client user's environment. Finally, login routine 22 provides computer information reports at step 68, 88 and 108 before login routine 22 finishes at step 110.

Referring to FIG. 2, once login routine 22 has managed the configuration of the network client at step 34, system policies can take effect at step 36. At step 38, initiation of the startup routine 22 installed by the configuration management system is begun.

Figure 4:
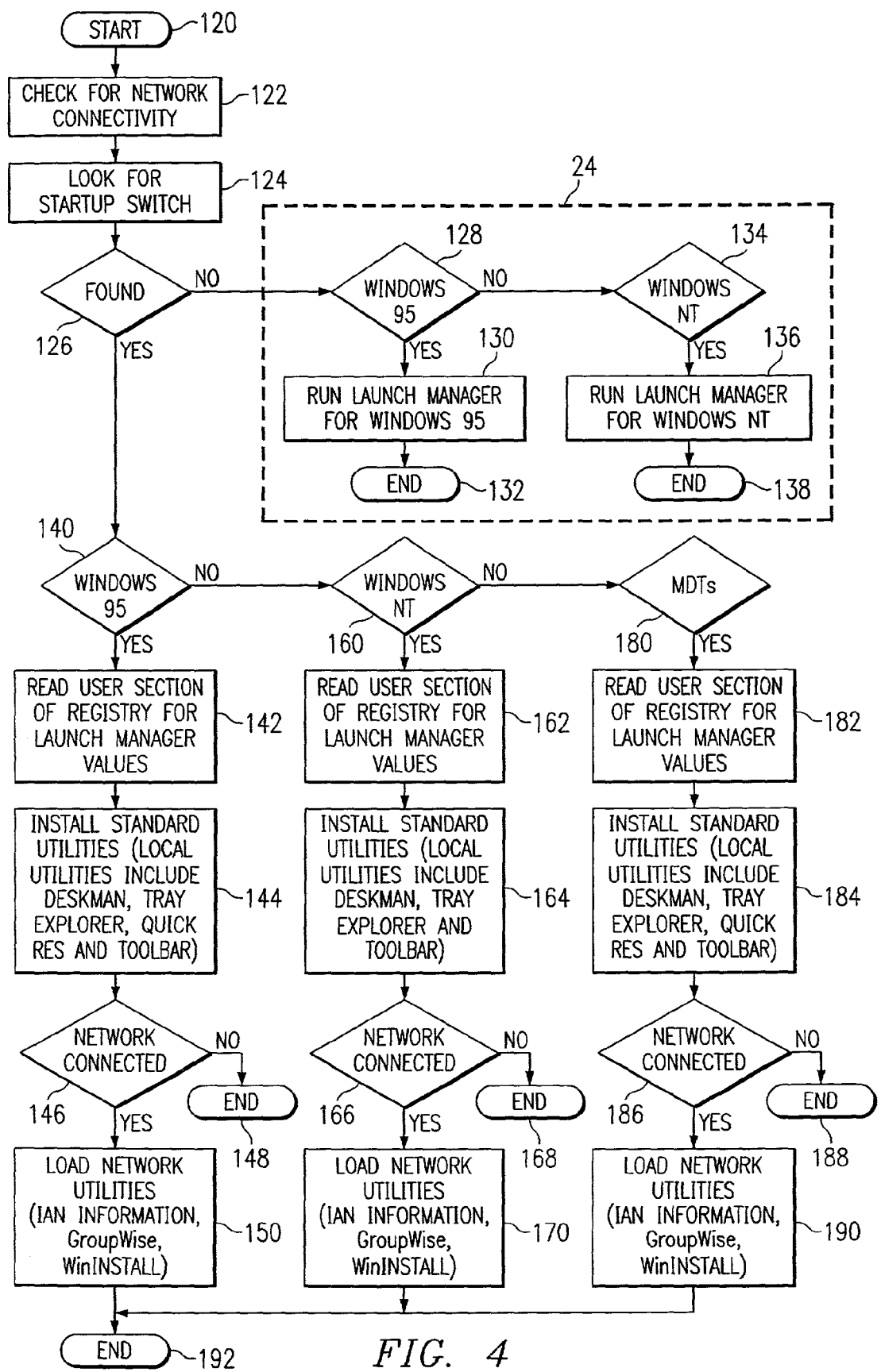
FIG. 4 depicts an exemplary flow diagram of a start-up routine and launch manager.

Referring now to FIG. 4, at step 120, startup routine 22 is called from local memory by the network client. Startup routine 22 looks for a command line startup switch at step 124 to determine if the operating system is on it initial boot up. If startup routine 22 fails to locate a command line switch at step 126, it will initiate launch manager 24 to allow the network client user to establish launch manager values. First, at step 128, launch manager 24 determines if Windows 95 is the operating system. If the operating system determination is yes, at step 130, startup routine 24 runs a launch manager for Windows 95. If the operating system determination at step 128 is no, then launch manager 24 determines at step 134 whether Windows NT is the operating system. If the operating system determination is yes, then, at step 136, launch manager 24 executes a launch manager for Windows NT. In summary, launch manager 24 allows a network client user to establish launch manager values if the startup routine is initiated other than during a network client boot-up.

If, at step 126, startup routine 22 finds a command line switch, then startup routine 22, at step 140, determines if Windows 95 is the operating system of the network client. If the operating system determination of step 140 is no, then startup routine 22 determines at step 160 if Windows NT is the operating system of the network client. If the operating system determination of step 160 is no, then the startup routine proceeds to step 180 to determine if a mobile data terminal ("MDT") with a customized Windows 95 operating system is on the network client, as depicted at step 180.

Once startup routine 22 has made the operating system determination, it executes its own bootup routine, as depicted by steps 142 through 150, 162 through 170, and 182 through 190, respectively. At steps 142, 162, and 182, startup routine 22 reads the user section of the network registry for launch manager values created by the launch manager 24. The launch manager values allow a network client user to individualize his personal computer within the constraints of startup routine 22. Next, startup routine 22, at steps 144, 164 and 184 can install predetermined local utilities such as DESKMAN, TRAY EXPLORER, QUICK RES and TOOLBAR. Once the local utilities are installed, at steps 146, 166, and 186, startup routine 22 will determine if the client is connected to the network, if not, at step 148, 168 and 188, will end. Finally, at step 150, 170 and 190 respectively, the startup routine can load network utilities such as local area network information, GroupWise and WinINSTALL, before ending management of the network client at step 192.

In operation, a network administrator will deploy login routine 20 and startup routine 22 to the network according to predetermined computing standards. After the initial boot-up, a network client user can alter launch manager values to personalize his network client, within the constraints of startup routine 22 as determined by the network administrator. WinINSTALL is a software program available from Seagate Software, which will allow the network administrator to manage the installation of applications and to maintain the integrity of standard applications across the network. For instance, when the network administrator wants to update an application, such as providing a new version or a patch to an application, the network administrator can use WinINSTALL to manage the installation of the update or patch. The LAN Information network utility can display system updates and messages in a graphical user interface at system boot-up. It provides communications to network client users regarding changes made by the system administrator.

Login routine 20 and startup routine 22 advantageously reduce the labor required to manage a local area network or a wide area network, by allowing central management of PCs interfaced with the network. This central management increases the satisfaction of network users by improving user interface, by improving communications between the administration of the network and the users, and by reducing the disruption required for operating system and application upgrades. Further, timely problem resolution is now possible through the distribution of patches and configuration upgrades, with reduced delivery time for application setup and install.

In one embodiment, the login routine and start-up routine coordinate with network workstations through a layered software environment. The start-up routine downloads instructions to workstations upon login so that distributed tools coordinate through network layers to control workstation configurations and applications by passing messages across the network. For instance, a message sent from a subsystem utility commands a comparison of the actual workstation configuration with a desired configuration and initiates modifications to achieve the desired configuration with instructions loaded by the start-up routine. The implementation of these instructions are further directed by related tools that communicate with messages over the network as appropriate. For instance, the desired configuration for a particular workstation may differ from the full instructions provided by the start-up routine so that additional messages from other utilities prevent initiation of predetermined instructions. Thus, specialized configuration results stem from a standardized set of instructions.

Figure 5:
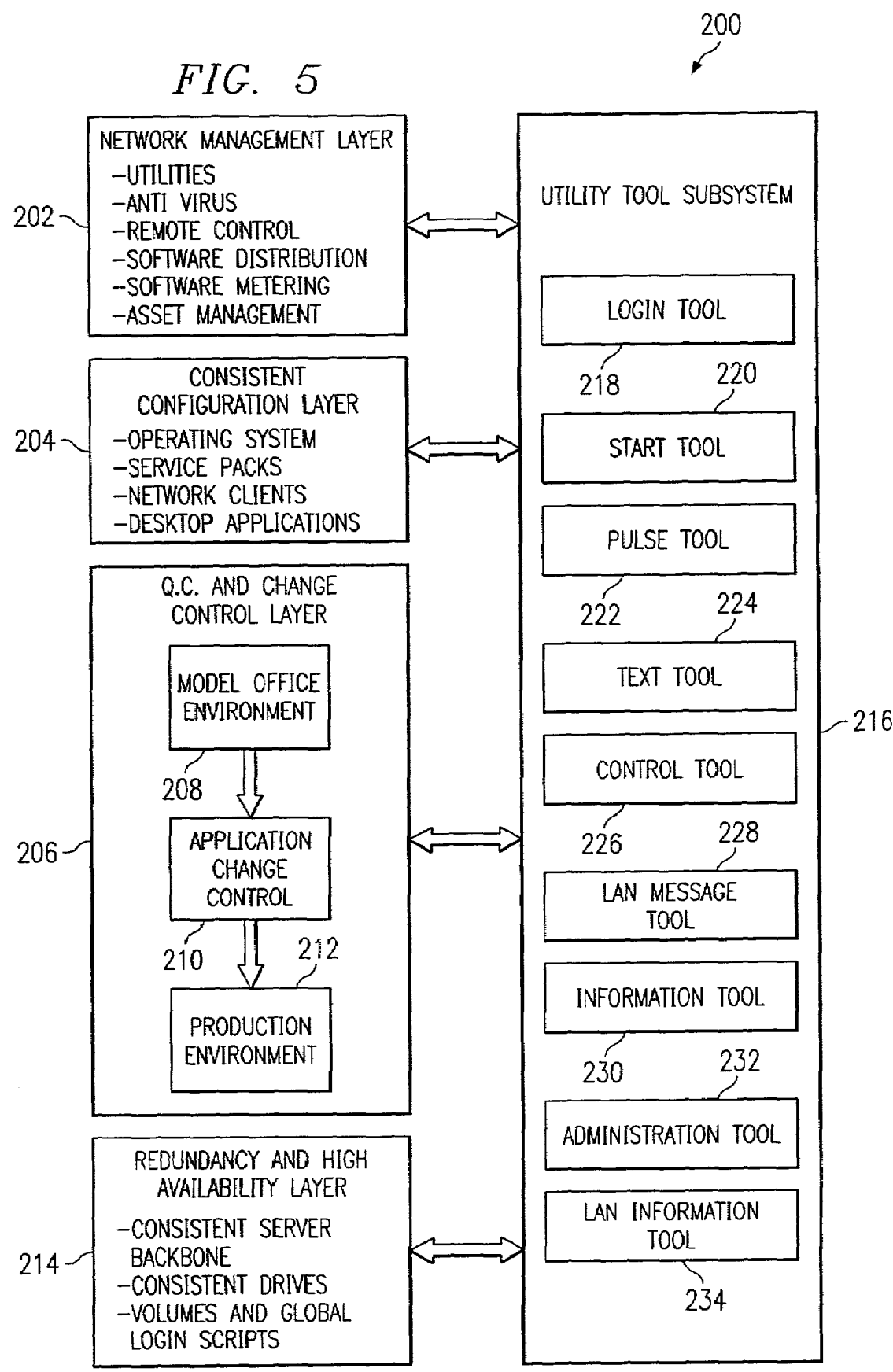
FIG. 5 depicts a block diagram of a layered network environment interfaced with a utility tool subsystem.

Referring now to FIG. 5, a block diagram depicts layers for management of a desktop environment of client computers interfaced with a server. A network management layer 202, consistence configuration layer 204, quality control and change control layer 206 and redundancy and high availability layer 214 cooperate with a utility tool subsystem 216 to manage desktop configurations of client computers.

Network management layer 202 has commercially available tools and utilities for managing a network. For instance, utilities, antivirus, remote control, software distribution, software metering and asset management applications reside at network management layer 202 to perform desired management functions with respect to network assets. Network management layer 202 interfaces with utility tool subsystem 216 for site specific configuration, consistency and to augment interoperability between elements of network management layer 202.

Consistence configuration layer 204 accommodates site specific as well as global workstation configuration changes, such as setting enterprise application icons in the same place on each workstation for a consistent desktop look and feel. Consistent configuration layer 204 maintains service packs and patches and interfaces with utility tool subsystem 216 to ensure that network workstations have all necessary updates, both for applications and the operating system. Utility tool subsystem 216 executes at login so that changes are made to operating system and applications before user access to a desktop. In addition, consistent configuration layer 204 presents users with network bulletins, such as to inform users of upcoming network changes and planned outages, and supports emergency management tools for responding to unexpected or urgent network problems. For instance, consistent configuration layer 204 cooperates with workstations to dispatch new virus signatures or to change DNS information for workstations to allow for unplanned outages of network assets.

Quality control and change control layer 206 manages integration of workstation applications and operating systems. A model office environment 208 provides a day-to-day environment with a preproduction configuration so that application or system changes may be loaded with messages after the changes are unit tested. For instance, a predetermined number of workstations, such as five percent, use model office environment 208. This allows testing of both network load and integration with existing applications and operating systems. A production environment 212 is updated from model office environment 208 on a regular, such as weekly, schedule with a replication change control module 210. Scheduled updates ensure that application or operating system changes will perform in the same way in the production environment as in the model office environment. For instance, application stewards or developers may be included in a model office environment to allow them to test applications against the most recent network changes or application deployments so that difficulties with proposed changes may be addressed before the proposed changes are enacted on production workstations.

Redundancy and high availability layer 214 provides a consistent server backbone, consistent drives and volume and global login scripts to improve network reliability. Production environment 212 is replicated for workstations of the network so that file servers have identical contents. Thus, redundancy and high availability layer 214 allows reassignment of drive or share assignments in the event of a planned or unplanned server outage. Further, the use of global login scripts allows for a consistent environment that can be rapidly changed to match changing conditions through redundancy and high availability layer 214.

Utility tool subsystem 216 resides at the confluence of each layer to provide fast and reliable desktop changes and application deployment through a variety of tools. Utility tool subsystem 216 tools are created with, for instance, Visual Basic 6 to improve integration with Windows operating systems and to enable the use of Microsoft provided application program interfaces (API). APIs provide system level capability to manage desktop operating system for full featured access to system registry, file system, network clients and other management functionality. In comparison with currently available system policies, the utility tool subsystem 216 allows total enterprise solution.

A login tool 218 launches at login time for workstations of the network upon a receipt of a login script and keeps the tools of utility tool subsystem 216 current. Login tool 218 determines if a workstation is connecting through the network or a dial-in connection, and only launches for network connections. If a workstation connects to the network through a local area network or wide area network connection, login tool 218 copies the most recent utility tool subsystem 216 files to the hard drive or other permanent memory of the workstation and executes start tool 220.

Start tool 220 performs a number of functions, including unattended installations, creating and maintaining a consistent user interface, applying global fixes and changes, updating passwords, maintaining remote access phone books, site specific and global configuration control, and launching or loading predetermined programs. Unattended installations are performed with deferred installation based on a comparison of workstation version information to software registry information. For instance, login tool 218 updates workstation hard drives with current files and then launches start tool 220 which sends a message to the workstation to install updated files based on a comparison of version information and registry information. The workstation prompts the user for approval to install the updated software version or application or to postpone installation in cases where the user has a deadline or needs to log in quickly. A limit on deferred installation, such as five deferments, is set so that the installation occurs without user approval if necessary to properly maintain the workstation.

One advantage of the deferred installation performed by start tool 220 is that unattended installations having a higher degree of risk of failure are more reliably performed and monitored. For instance, installation failure when a workstation is logged into a network, especially where the installation is through network client software and service packs, often leads to network connection failure and extensive labor expended in getting the workstation logged back into the network before attempting to reinstall the package. Start tool 220 reduces recovery time and complexity for installation failures by using messages to initiate installation from installation files copied to workstation hard drives by login tool 218 before running the unattended installation. This allows for a point of recovery in case of failure and more rapid corrective action to reinstall a failed installation packet even if the workstation is no longer able to attach to the network. As another example, if an installation package has potential causes of failure identified in advance, start tool 220 may send messages to prevent the problems before installation, such as messages to initiate actions in applications related to the potential cause of failure. Further, start tool 220 creates a log based on messages received from workstations regarding installation success or failure to track and solve potential problems.

Start tool 220 creates and maintains a consistent desktop user interface, applies global bug fixes and changes, and launches or loads predetermined programs. As a workstation logs in, start tool 220 sends a message to the workstation to make necessary changes to the workstation's configuration even if previously changed by another user, deleted or modified. Workstations thus have a high level of consistency, such as a consistent set of site specific icons or tool bars, wallpaper or screen savers, and thus reduces training time and labor overhead for workstation maintenance. Also at login, start tool 220 applies global bug fixes and changes for identified configuration problems to ensure consistent desktop operation across the network. For instance, start tool 220 sends a message that initiates a program loaded through login tool 218 to perform maintenance on operating system images as each workstation logs in, making individual operating system image updates unnecessary. Further, at each workstation login a check is performed through comparison of version and registry information so that configuration and operating system images are ensured to be correct. In addition, start tool 220 launches site specific or enterprise wide applications or utilities such as instant messaging systems, email programs or time tracking tools.

Start tool 220 performs a number of administrative functions to reduce labor overhead associated with operation of a network. For instance, start tool 220 periodically changes the local administrator's password at workstations to reduce the need for direct intervention on a machine by machine basis. Start tool 220 also maintains remote access (RAS) phone book entries and their related configuration options to reduce the need for machine by machine updates of RAS dial-up connections. Start tool 220 augments operating system and network operating system policies with additional capability and flexibility to adapt desktop configuration settings beyond the capability of individual workstations. This provides a single point of global configuration control and site specific options, such as settings based on environment variables, the presence or absence of a file, group or domain membership, NDS or AD information, IP address or segment information and specific types of hardware and software.

Pulse tool 222 is an emergency management tool run as a TSR loaded into workstation memory by start tool 220 upon connection of the workstation to the network. Pulse tool 222 reads a network based job queue on a predetermined and configurable schedule to quickly react to problems, such as unplanned system outages or virus attacks. Pulse tool 222 sends messages to run programs on network workstations, simultaneously and enterprise wide if necessary, to execute programs on workstations for fixing problems such as addressing virus attacks.

In certain situations, exceptions to global configuration are necessary to handle exceptional conditions. For instance, certain workstations of a network need custom configurations such as utility computers that serve one or more specific business functions or other dedicated tasks, or workstations associated with users having business needs different from the established standard. Text tool 224 allows a workstation to prevent start tool 220 from running one or more configuration routines on that workstation. For instance, the workstation selects an option not to run a configuration routine such as a particular program, a particular protocol, installation of a program or update with a service pack, a particular utility, or other configuration routine set by start tool 220. The selected configuration routine is prevented from operating on the workstation either by identification at the workstation or messages sent from the workstation to text tool 224 which limits the messages from start tool 220 for that workstation. Text tool 224 is launched through password protected interfaces to allow for distinctive configuration of individual computers where needed without abandoning global management configuration in other areas. For instance, for each selected configuration routine that is deferred or avoided with text tool 224, a file is placed on the selected workstation's hard drive by a message sent by text tool 224 to indicate to start tool 220 not to make a change to the given configuration area or application that is selected.

Control tool 226 manages the core programs of utility tool subsystem 216 and writes information to a set of configuration files for use by start tool 220, pulse tool 222 and login tool 218. Control tool 226 is customizable and designed to manage both site specific and global settings through a password protected central location. Control tool 226 configures model office environment 208 and production environment 212 so that new configurations and application changes may be tested and deployed to model office environment 208 before migration to production environment 212. LAN message tool 228 provides immediate information dissemination across the network, such as when pulse tool 222 detects an emergency need for action for other difficulty. LAN message tool 228 queries a network based file queue on a predetermined and configurable schedule, such as every five minutes or a range varying from every minute to once a day. If new information is placed in the LAN message network based file queue, LAN message tool 228 displays the information as a pop-up window that opens on top of any other windows of the desktop to assure dissemination of the information to users as quickly as possible. LAN message tool 228 also displays text based information based on membership of logical groups, context, computer name and the absence or presence of a file or directory in a computer. One important advantage of LAN message tool 228 is that it allows information dissemination through a system aligned with the network operating system without user input as compared with email notification which usually involves a separate email system and user interaction.

Information tool 230 provides system information for a workstation in a single easy-to-use interface customizable as needed. For instance, login tool 218 copies information tool 230 to a workstation hard drive and start tool 220 creates an icon on the workstation for the information tool 230. By initiating the icon, a user or network staff obtains relevant workstation information through a single interface, such as information on the workstation's global group membership, network group membership, processor, network and operating system identification and addresses, as well as workstation specific information including memory availability. In addition, once information tool 230 loads on a workstation, it operates in a silent mode during start-up to create a log file containing the information specified by each site. The log file is available through initiation of the information tool icon at the workstation or transferable to network storage by a message from information tool 230 making individual workstation information available as needed.

Admin tool 232 aids network administration from virtually any workstation while still preventing unauthorized user access to key areas of the workstation. Admin tool 232 defines a workstation as a local administrator for that workstation and locks out configuration interfaces with password controlled access. Start tool 220 runs admin tool 232 at each login to assure the interfaces are locked and to allow access by network administration through a password so that configuration interfaces are available to allow administration staff to more easily use remote control packages for problem resolution or reconfiguration of the workstation. Thus, admin tool 232 provides security over system and network policies while allowing each workstation to perform local administration support operations even if support staff is not signed in as the user of the workstation. Thus, by having the workstation user defined as a local administrator without direct unprotected access to key configuration areas on the computer, admin tool 232 reduces management overhead and time requirements for problem resolution.

A LAN information tool 234 disseminates information to the network as does information tool 230, however LAN information tool 234's dissemination of information is with a different focus and capability. LAN information tool 234 is a web based program loaded by start tool 220 on workstations each time a user logs into the workstation. As compared with the emergency information dissemination of information tool 230, a LAN information tool 234 provides dissemination of more mundane information such as upcoming changes on the network or changes in procedures for day to day tasks like changing passwords or defragmenting hard drives. LAN information tool 234 provides an Internet compliant interface complete with graphics and text to communicate clear and concise instructional information, such as screen shots of menus or other graphical information. As another illustration, LAN information tool 234 presents hot links for activation through a mouse click to trigger the workstation's web browser and link to related web based material, such as explanatory information on a corporate intranet. LAN information tool 234 opens as a top most window to avoid obstruction by other information and make information and instructions globally available on a user by user basis at each login.

Figure 6A:
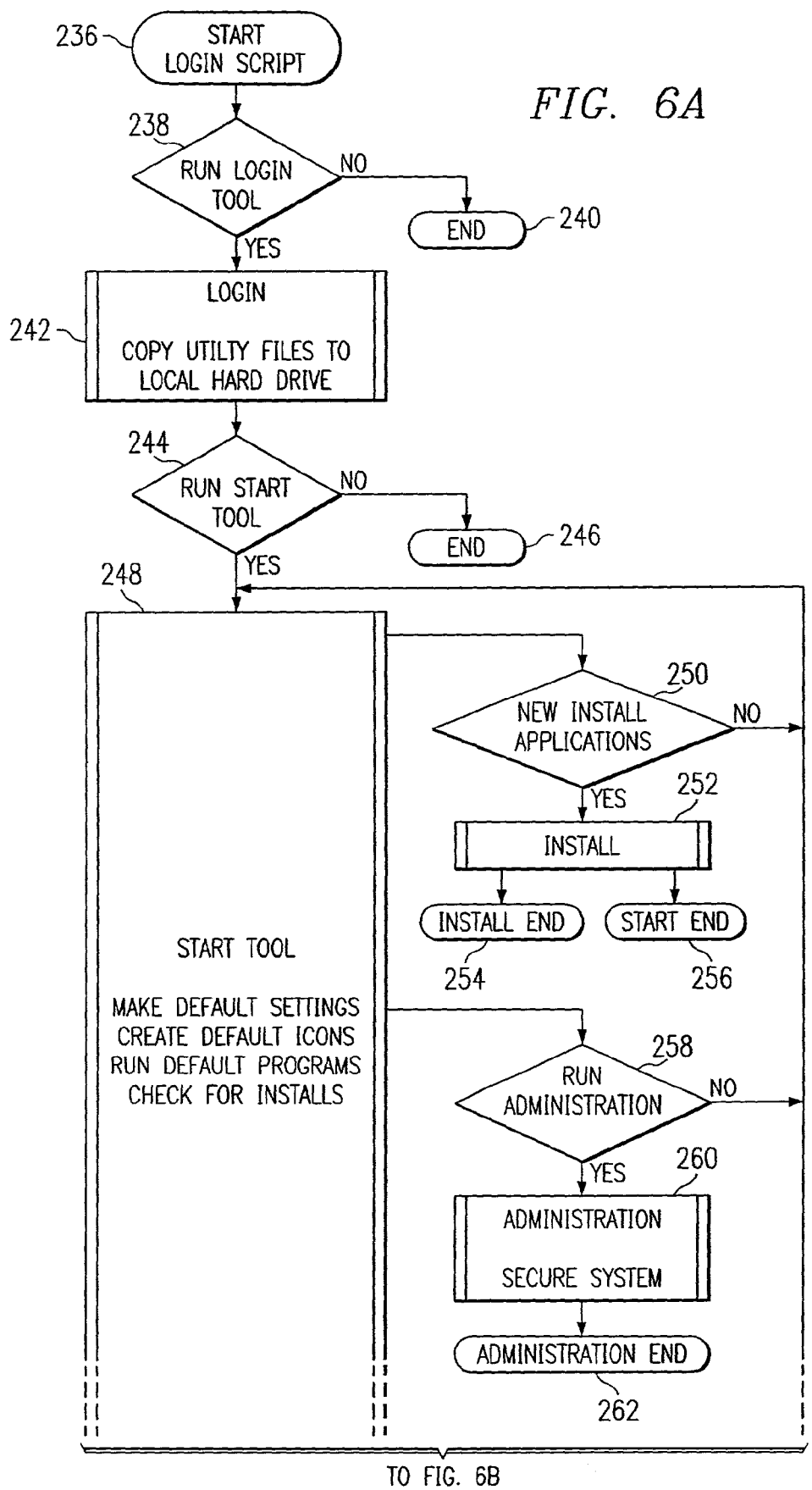
FIGS. 6A–6B depict a flow diagram of network management with the utility tool subsystem.
Figure 6B:
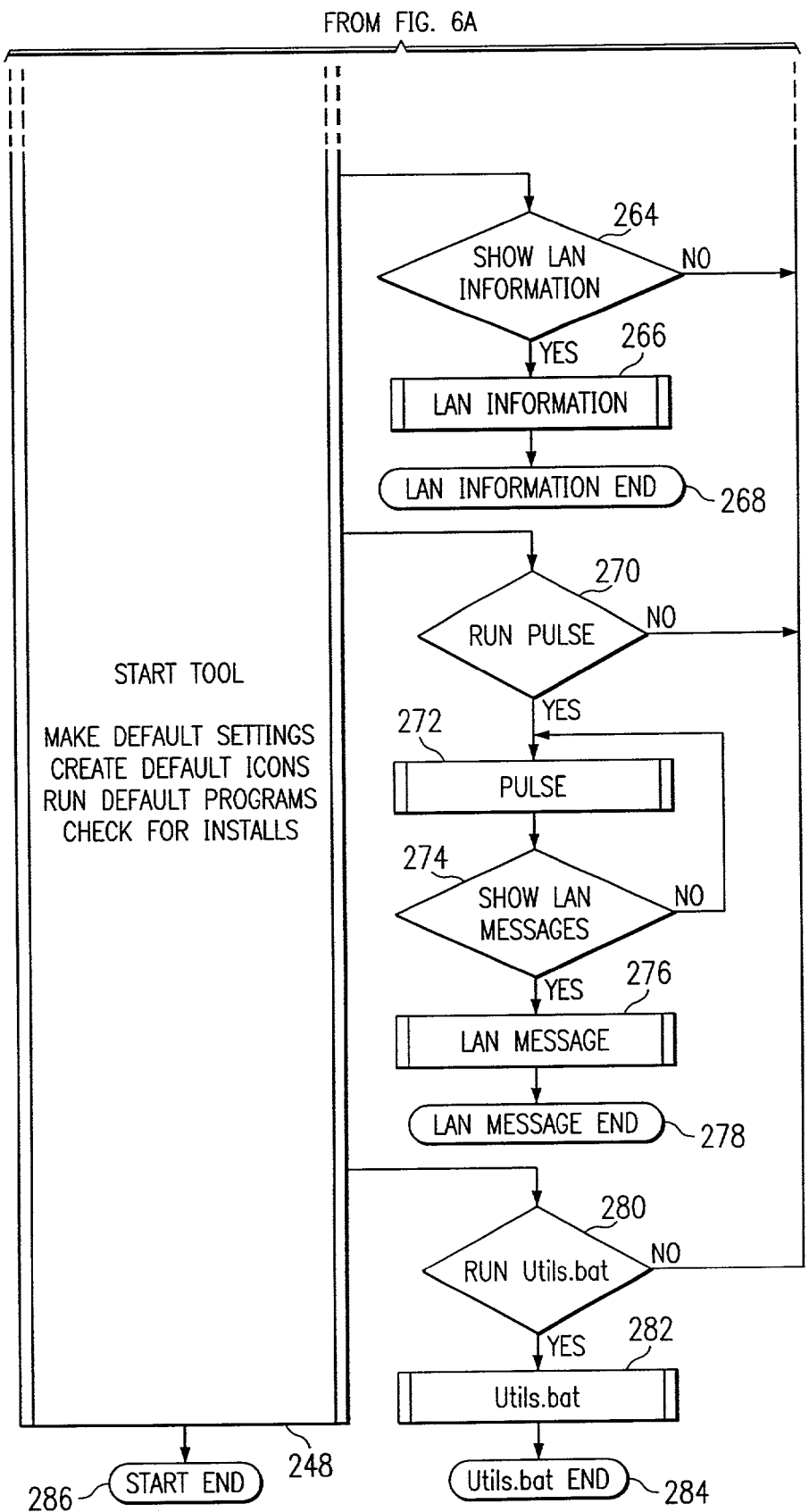

Referring now to FIGS. 6A–6B, a flow diagram depicts functions performed by utility tool subsystem 216. At step 236, a login script is initiated by power up or other activation at a workstation. At step 38 a determination is made whether to run login tool 218. If not, for instance when the text tool 224 directs the login tool not to run, then the process ends at 240. If yes, then at step 242 login tool 218 copies utility files to the local hard drive of the workstation. For instance, utility files may include configuration information, new applications, new versions of existing applications, or other information such as LAN information tool 234 messages.

At step 244, a determination is made of whether to run start tool 220. If not, at step 246 the process ends. If start tool is run, then at step 248 a series of inquiries are initiated with default settings, default icons, default programs and installs determined.

At step 250, a determination is made of whether a new application should be installed. If yes, then at step 252 a message is sent to initiate install of the application from the files stored by start tool 220 on the workstation and at step 254 install ends to return to start tool 248 or start ends at step 256. For instance, start tool initiation may end at step 256 if the computer system reboots for the install.

At step 258, a determination is made of whether to run administration tool 232. If yes, administration tool 232 runs at step 260 to ensure the administration files are current and ends at step 262 to return to start tool 248. Similarly, at step 264 a determination is made of whether LAN information should be shown and if yes, at step 266 LAN information tool 234 is run to disseminate information and at step 268 LAN information tool 234 ends to return to start tool 248.

At step 270, determination is made of whether to run pulse tool 270. If yes, pulse tool 222 is run at step 272. At step 274 a determination is made as to whether to show a LAN message and if yes, at step 276 LAN message tool 228 disseminates the information and at step 278 LAN message tool 228 ends. Pulse tool 222 periodically runs a search of a network queue and posts messages in cooperation with LAN message tool 228 as appropriate.

At step 280, a determination is made to run a utilities batch program and if appropriate utilities batch program runs at 282 and ends at 284. Start tool 220 complete execution at step 286.

Advantageously, utility subsystem 216 reduces the complexity of network management by obtaining desired configurations of workstations with messages that call previously stored configuration applications. Thus centralized control of workstations is maintained with reduced overhead and complexity through decentralized actions initiated by applications on workstations. The use of a start tool to ensure consistent applications across workstations aids efficient management with continually updated programs based on user logins.

Although the present invention has been described in detail, it should be understood that various changes, substitutions and alterations can be made hereto without departing from the spirit and scope of the invention as defined by the appended claims.

What is claimed is:

1. A method for centrally managing plural network clients interfaced with a network host, the method comprising the steps of:

initiating a login script at a network client, the login script calling a login routine associated with the network host that operationally manages the configuration of the network client;

installing a start-up routine with the login routine, the start-up routine associated with the network client;

using the start-up routine to determine an operating system of the network client; and managing configuration of the operating system of the network client with the start-up routine according to the operating system of the network client.

2. The method according to claim 1 wherein the managing the start-up step further comprises the steps of:
   directing the network client to install predetermined local utilities; and
   directing the network client to load predetermined network utilities.

3. The method according to claim 2 wherein the start-up routine installs the predetermined local utilities according to launch manager values.

4. The method according to claim 3 further comprising the step of setting launch manager values with a launch manager.

5. The method according to claim 1 further comprising the steps of
   initiating a login routine with the login script; and
   using the login routine to initiate the start-up routine on the network client.

6. The method according to claim 5 wherein the login routine resides on the network host.

7. The method according to claim 5 wherein the start-up routine resides on the network client.

8. The method according to claim 1 wherein the operating system comprises one of either Windows NT or Windows 95.

9. The method of claim 1, wherein managing configuration of the operating system of the network client comprises managing configuration of one or more of:
   one or more network communication protocols associated with the operating system of the network client;
   one or more patches associated with the operating system of the network client;
   one or more network security releases associated with the operating system of the network client; and
   one or more site-specific configuration requirements associated with the operating system of the network client.

10. A method for centrally managing plural network clients interfaced with a network host, the method comprising the steps of:
    initiating a login script at a network client;
    automatically calling a login routine, the login routine operationally managing configuration of an operating system of the network client;
    using the login routine to install a start-up routine on the network client; and
    automatically calling the start-up routine, the start-up routine operationally managing the start-up of the network client.

11. The method according to claim 10 wherein the start-up routine manages the start-up of the network client by performing a method comprising the steps of:
    directing the network client to install predetermined local utilities; and
    directing the network client to load predetermined network utilities.

12. The method according to claim 11 wherein the login routine manages the configuration of the network client by performing a method comprising the steps of:
    gathering system information;
    creating standard directories;
    determining the operating system of the network client;
    installing default applications; and
    establishing a desktop configuration.

13. The method according to claim 12 wherein the establishing a desktop configuration step comprises the step of installing the launch manager.

14. The method according to claim 13 wherein the login routine resides on the network server.

15. The method according to claim 13 wherein the launch manager resides on the network client.

16. The method according to claim 13 wherein at least one network client has a Windows 95 operating system.

17. The method according to claim 16 wherein at least one network client has a Windows NT operating system.

18. The method of claim 10, wherein managing configuration of the operating system of the network client comprises managing configuration of one or more of:
    one or more network communication protocols associated with the operating system of the network client;
    one or more patches associated with the operating system of the network client;
    one or more network security releases associated with the operating system of the network client; and
    one or more site-specific configuration requirements associated with the operating system of the network client.

19. A system for central management of plural network clients interfaced with a network host, each network client having an operating system, the system comprising:
    a start-up routine associated with each network client, the start-up routine operational to determine the network client operating system, and to direct network clients to install predetermined local utilities, the start-up routine further operational to direct network clients to load predetermined network utilities; and
    a login routine associated with each network client, the login routine operational to install the start-up routine, to determine the network client operating system, and to manage configuration of the network client operating system according to the determined network client operating system.

20. The system according to claim 19 wherein the network comprises a local area network.

21. The system according to claim 19 wherein the network comprises a wide area network.

22. The system according to claim 19 further comprising a launch manager associated with each network client, the launch manager operational to define the local utilities installed on each network client by the start-up routine.

23. The system according to claim 19 wherein each network client has an operating system, and wherein at least one network client has a Windows 95 operating system and at least one network client has a Windows NT operating system.

24. The method of claim 19, wherein managing configuration of the operating system of the network client comprises managing configuration of one or more of:
    one or more network communication protocols associated with the operating system of the network client;
    one or more patches associated with the operating system of the network client;
    one or more network security releases associated with the operating system of the network client; and
    one or more site-specific configuration requirements associated with the operating system of the network client.

25. A method for establishing the configuration of network workstations, the method comprising:
    initiating login of one or more workstations to the network;

loading a start-up routine to the one or more workstations, the start-up routine having instructions for workstation configuration;

initiating operation of the start-up routine instructions with a message sent over the network to the one or more workstations; and configuring an operating system of the workstation according to the start-up routine instructions.

26. The method of claim 25 further comprising:

determining an exception to the start-up routine instructions for a predetermined workstation; and preventing the initiation of start-up routine instructions associated with the exception.

27. The method of claim 26 wherein preventing the initiation of instructions further comprises sending a message over the network to the predetermined workstation to identify start-up routine instructions.

28. The method of claim 25 further comprising:

executing the start-up routine instructions on the workstation to initiate a pulse tool on the workstation; and monitoring a network queue with the pulse tool to determine actions for the workstation.

29. The method of claim 28 wherein the start-up routine instructions comprise the pulse tool.

30. The method of claim 25 wherein the configuration comprises an application, the application loaded with the start-up routine, the method further comprising:

sending a message to the workstation over the network to approve or defer installation of the application; and deferring installation of the application if an approval message is not returned by the workstation.

31. The method of claim 30 further comprising:

sending one or more additional messages to the workstation over the network to approve or defer installation of the application;

tracking the number of deferrals of the installation; and sending a message to the workstation to initiate installation of the application without approval after a tracking a predetermined number of deferrals.

32. The method of claim 25, wherein configuring the operating system of the network client comprises configuring one or more of:

one or more network communication protocols associated with the operating system of the network client;

one or more patches associated with the operating system of the network client;

one or more network security releases associated with the operating system of the network client; and one or more site-specific configuration requirements associated with the operating system of the network client.

33. A system for configuration of workstations associated with a network, the system comprising:

a login tool that receives login requests from the workstations; and a start-up tool called by the login tool upon receipt of a login request, the start-up tool providing configuration instructions for configuring an operating system of the workstation to the workstation making the login request;

wherein a message sent through the network to the workstation initiates the configuration instructions for configuring the operating system of the workstation.

34. The system of claim 33 wherein the configuration instructions comprise predetermined desktop icons.

35. The system of claim 33 wherein the configuration instructions comprise an application, the message initiating installation of the application.

36. The system of claim 33 wherein the configuration instructions comprise a pulse tool, the pulse tool for monitoring a network queue on a predetermined schedule to provide emergency management of the workstation based on instructions received in the queue.

37. The system of claim 36 further comprising a user message tool associated with the pulse tool, the user message tool for disseminating information associated with emergency management detected by the pulse tool.

38. The system of claim 33 further comprising:

a text tool operational to identify workstation configuration exceptions, the text tool preventing initiation of predetermined configuration instructions by a workstation.

39. The system of claim 33 further comprising:

an information tool associated with the network, the information tool for disseminating information to workstations, the information tool sending a message to one or workstations to display information based on instructions stored on the workstation by the start-up tool.

40. The system of claim 39 wherein the displayed information comprises information displayed through a browser.

41. The system of claim 40 wherein the displayed information comprises a sample screen shot of an installed application.

42. The system of claim 40 wherein the displayed information comprise a hot link to an intranet site.

43. The system of claim 33, wherein the instructions for configuring the operating system of the workstation comprise instructions for configuring one or more of:

one or more network communication protocols associated with the operating system of the workstation;

one or more patches associated with the operating system of the workstation;

one or more network security releases associated with the operating system of the workstation; and one or more site-specific configuration requirements associated with the operating system of the workstation.

* * * * *